July 5, 1955 P. C. BRINER 2,712,634
ELECTRICAL TESTING APPARATUS
Filed Sept. 29, 1950
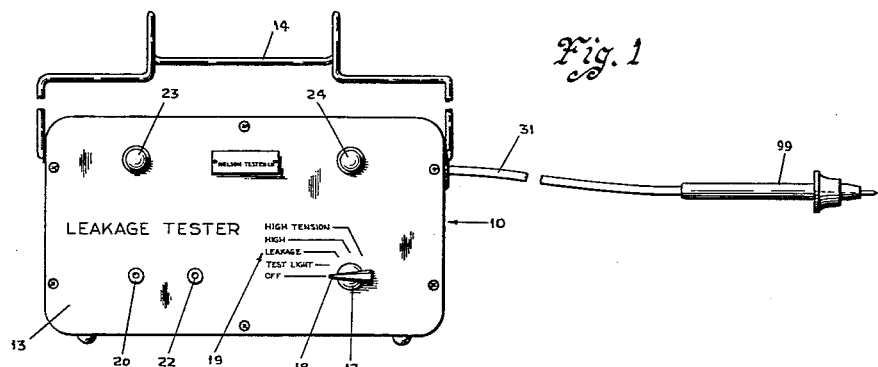
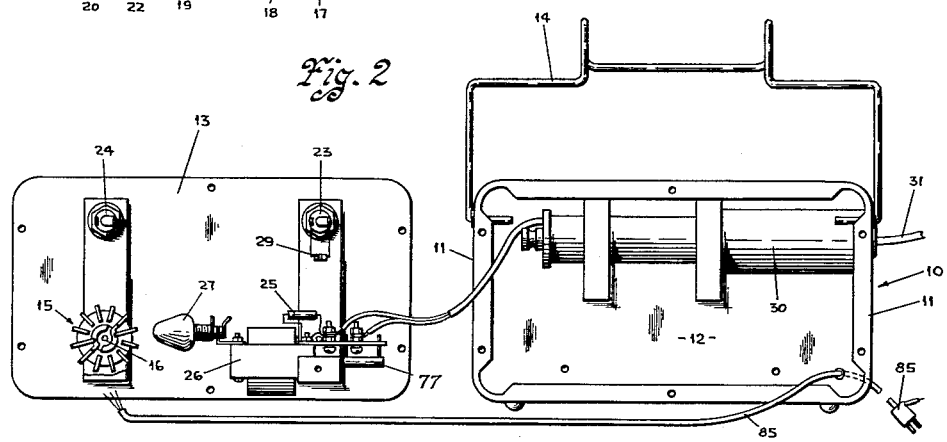
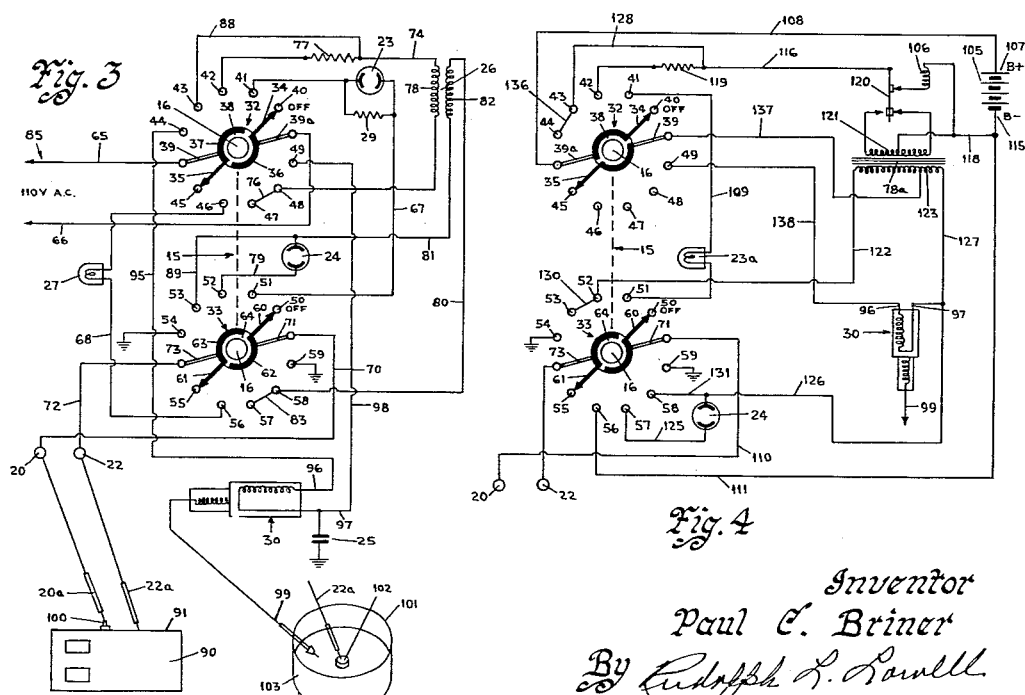
Inventor
Paul C. Briner
By Rudolph L. Lowell
Attorney United States Patent Office 2,712,634
Patented July 5, 1955

2,712,634

ELECTRICAL TESTING APPARATUS

Paul C. Briner, Waterloo, Iowa, assignor to Nelson Tester Company, Incorporated, Waterloo, Iowa, a corporation of Iowa Application September 29, 1950, Serial No. 187,408

1 Claim. (Cl. 324—73)

This invention relates generally to testing apparatus for electrical systems and in particular to an apparatus for testing leakage and continuity in electrical systems and electrical parts of automobiles.

An object of this invention is to provide an improved apparatus for testing the electrical systems and electrical parts in an automobile.

A further object of this invention is to provide a single testing apparatus capable of testing both a low-voltage wiring system and the ignition system in an automobile for continuity, grounds, shorts, leakage and quality of insulation.

Another object of this invention is to provide a testing apparatus for an electrical system which operates at a voltage and current capable of smoking out grounds and shorts in the system, or in defective electrical parts forming part of the system, without any resultant injury to the good electrical parts in the system, or danger to the tester operator.

Yet a further object of this invention is to provide a leakage and continuity testing apparatus for the electrical systems and parts in an automobile which is of a rugged and simple construction, economical in manufacture, and efficient in operation over a prolonged service life with a minimum of repair and servicing attention.

Further objects, features and advantages of this invention will become apparent from the following description when taken in connection with the accompanying drawing in which:

Fig. 1 is a front elevational view of the testing apparatus of this invention;

Fig. 2 is a front elevational view of the tester with the front panel removed and swung to one side to show the assembly of units, forming part of the tester, on the rear side of the panel;

Fig. 3 is a diagrammatic electrical circuit for the tester shown in Figs. 1 and 2; and, Fig. 4 is a diagrammatic electrical circuit for a modified form of the invention.

With reference to the drawing the tester of this invention is shown in Figs. 1 and 2 as including a cabinet or box 10 having end walls 11, a rear wall 12, and a removable front wall or panel 13. A handle for carrying the tester is indicated at 14.

Mounted on the rear side of the front panel 13 (Fig. 2) is a double deck or two gang rotary switch, designated generally as 15, which includes a rotary shaft 16 having one end forwardly extended through the panel 13. An actuating knob 17 (Fig. 1) is fixed on the forward extension of the shaft 16. The switch 15 is of a usual commercial structure commonly employed in radio receiving sets. The knob 17 is formed with a pointer or indicator 18 for cooperation with test markings 19, carried on the front side of the panel 13.

A pair of test jack terminals 20 and 22 (Fig. 1) for receiving the plugs of test prods 20a and 22a, illustrated in Fig. 3, are open to the front side of the panel 13, and arranged in a spaced relation to one side of the actuating knob 17. Also mounted on the front side of the panel 13 are neon test lights 23 and 24 commercially available as NE-51 neon lamps.

Also carried on the rear side of the front panel 13 is a voltage step-up transformer 26, a 110 volt series lamp 27, a first resistor 77, a second resistor 29 connected across the neon lamp 23, and a condenser 25.

A high-frequency unit 30 mounted on the rear wall 12 of the cabinet 10 is provided with a discharge extension 31, projected outwardly from the cabinet. A plug-in 85 to a usual 110 volt A. C. supply is connected with the double deck or two gang rotary switch 15, as will appear later.

With reference to Fig. 3 the two gang deck switch 15 is illustrated as having a first deck unit 32 and a second deck unit 33. The deck unit 32 includes a pair of oppositely arranged switch arms 34 and 35 integrally formed with what might be termed slip segments 36 and 37, respectively, mounted for rotation with the switch shaft 16, but electrically insulated from the shaft by an annular insulator 38. The segments 36 and 37 are in slidable contact with bar conductors 39a and 39, respectively. A plurality of switch terminals 40–49, inclusive, are angularly spaced in a concentric relation about the shaft 16 in a manner such that the terminals 40 and 45, 41 and 46, 42 and 47, 43 and 48, and 44 and 49 are radially opposite each other, with the switch arm 34 cooperating with the terminals 40–44, inclusive, and the switch arm 35, with the terminals 45–49, inclusive. On rotation of the shaft 16, therefore, the switch arms 34 and 35 are simultaneously engaged with corresponding radially opposite terminals in the deck unit 32.

The second deck unit 33 is of a construction similar to the deck unit 32 and includes switch arms 60 and 61 integrally formed with slip segments 62 and 63, respectively, mounted about an insulator ring 64 carried on the shaft 16. The switch arm 60 is engageable with switch terminals 50–54, inclusive, and the switch arm 61 with switch terminals 55–59, inclusive. These terminals are angularly spaced in a concentric relation about the shaft 16 with the pairs of terminals 50—55, 51—56, 52—57, 53—58, and 54—59, being radially opposite each other.

In the assembly of the deck units 32 and 33 on the shaft 16, the switch terminals are arranged so that the pairs 40—50, 41—51, 42—52, 44—54, 45—55, 46—56, 47—57, 48—58, and 49—59 are opposite each other axially or longitudinally of the shaft 16.

The plug-in extension 85 has one lead 65 connected to the terminal bar 39 and its other lead 66 connected to the terminal bar 39a. The terminals 40 and 45 of the deck unit 32 represent the off positions for the switch arms 34 and 35, respectively. When the shaft 16, as viewed in Fig. 3, is rotated in a counterclockwise direction to position the switch arms 34 and 35 on the contacts 41 and 46, respectively, the rotary switch 15 is in a position corresponding to a movement of the indicator 18 on the knob 17 to the "test light" marking 19 on the front panel 13. The tester is now ready for testing continuity in an electrical system, with the circuit in the tester from the lead line 66 comprising the switch arm 34, terminal 41, test light 23, conductor 67, terminal 51, switch arm 60, and a conductor 70 connected between the conductor bar 71 of the deck unit 33, and the jack terminal 20. From the jack terminal 22 the circuit is completed through a conductor 72 connected to the conductor bar 73 of the deck unit 33, the switch arm 61, terminal 56, conductor 68 having the lamp 27 connected in series therein, terminal 46, switch arm 35 and conductor bar 39 to the lead line 65. Continuity in the electrical system being tested is indicated by the lighting up of the test lamp 23.

On a continued movement of the shaft 16 in a counterclockwise direction, as viewed in Fig. 3, to a next operating position at which the switch arms 34 and 35 are in engagement with the terminals 42 and 47 of the deck unit 32, and corresponding to a moved position of the indicator 18 opposite the "leakage" marking 19 on the panel 13, the tester is set for testing leakage in an electrical system. From the lead line 66 (Fig. 3) this "leakage" circuit includes the conductor bar 39a, the switch arm 34, terminal 42, a conductor 74 connected between the terminal 42 and a strap 76 which connects the terminals 47 and 48 of the deck unit 32. From the terminal 47 the "leakage" circuit includes the switch arm 35, the conductor bar 39 and lead line 65. Connected in series in the conductor 74 is a resistance 77 and a primary coil 78 of the transformer 26.

With the movement of the switch arms 34 and 35 of the deck unit 32 into engagement with the switch terminals 42 and 47, the switch arms 60 and 61 of the deck unit 33 are concurrently moved into engagement with the terminals 52 and 57. The terminal 52 is connected by conductors 79 and 81 with the secondary 82 of the transformer 26, which in turn is connected through the conductor 80 with a strap 83 between the terminals 57 and 58 of the deck unit 33. The leakage test lamp 24 is series connected in the conductor 79, so as to be in series with the transformer secondary coil 82.

From the terminal 57, the leakage circuit for the deck unit 33 includes the switch arm 61 and the conductor bar 73 which is connected through the conductor 72 with the jack terminal 22. The jack terminal 20 is connected through the conductor 70 with the conductor bar 71 and through the switch arm 60 to the terminal 52, so as to complete the circuit for the deck unit 33.

The resistance 77 has a value of 300 ohms, 20 watts and the transformer 26, with such resistance, is capable of developing a voltage in the secondary coil 82 of about 650 volts. At this voltage the current through the secondary is about 45 milliamps. The test light 24 is connected in series in the conductor 79, so that on closing of the jack terminals 20 and 22 by location of the jack prods 20a and 22a over those parts of an electrical system to be tested, leakage is indicated by a bright lighting up of the test light 24. Most battery lines, ignition lines, armatures, fields, and coils having metal cases, have a normal amount of capacity leakage. This leakage will show up as a faint steady glow in the test lamp 24. However, if the insulation in these parts is defective the test lamp 24 will burn with a bright or jumpy glow.

The spot location of any leakage in the electrical system or part being tested can be readily determined by "smoking out" or "buzzing out" the defective element. This is done by rotating the shaft 16 (Fig. 3) to a position at which the switch arms 34 and 35 are in engagement with the terminals 43 and 48, respectively, which corresponds to a moved position of the indicator 18 to the "high" marking 19 on the front panel 13. The "high" circuit of the tester for the deck unit 32 from the lead line 66 includes the conductor bar 39a, the switch arm 34, and the terminal 43 which is connected by a conductor 88 with the conductor 74, so as to shunt the resistance 77. From the conductor 88, the circuit includes the conductor 74, and the transformer primary coil 78, terminal 48, switch arm 35, and the conductor bar 39 which is connected to the lead line 65.

The "high" circuit for the deck unit 33 from the jack terminal 20 includes conductor 70, conductor bar 71, switch arm 60, terminal 53, and a conductor 89 connected with the conductor 81 so as to shunt the test light 24. From the conductor 81, this circuit includes the transformer secondary coil 82, conductor 80, terminal 58, switch arm 61, conductor bar 73, and the conductor 72 which is connected with the terminal 22.

With the resistance 77 eliminated from the "high" circuit for the deck unit 33 the secondary coil 82 operates at a voltage of about 725 volts with a current of 40 milliamps. This potential and current is sufficient to smoke out any defective insulation or leakage in a defective part of an electrical system, without causing any injury or damage to those parts in the system which are not defective.

This "smoking out" is illustrated diagrammatically in Fig. 3 for a generator field indicated at 90 with the test rod 20a from the terminal 20 being in contact with the field post 100 and the test prod 22a from the terminal 22 being grounded to the field housing or casing 91.

To further aid in the spotting or location of a defect in a defective part of an electrical system the tester of this invention contemplates the use of a high frequency circuit. For this purpose the switch arms 34 and 35 of the deck unit 32 are moved into contact with the terminals 44 and 49, respectively, and the switch arms 60 and 61 of the deck unit 33 are moved into contact with the terminals 54 and 59, also respectively, which corresponds to a movement of the indicator 18 opposite the "high tension" marking 19 on the front panel 13. The "high tension" circuit for the deck unit 32 includes from the lead line 66 the conductor bar 39a, switch arm 34 and terminal 44, which is connected through conductor 95 to one lead line 96 of the high frequency unit 30. From the lead line 97 of the high frequency unit 30, the circuit includes the conductor 98, terminal 49, switch arm 35, and conductor bar 39 which is connected to the lead line 65.

The switch arms 60 and 61 of the deck unit 33, in the "high tension" circuit, are merely grounded at the terminals 54 and 59. The high frequency unit 30 is of a commercially available type used in X-ray machines and operates at a frequency of about 2000 kilocycles with about 30,000 volts, and has a single discharge electrode 99.

The electrical discharge at the electrode 99 normally gives a light blue spark when grounded to all normal high tension parts, which spark is corona discharge. However, when a very perceptible and evident white spark travels through the blue spark of the corona discharge defectiveness in the part being tested is indicated. As illustrated for a distributor cap 101 in Fig. 3, the test prod 22a is in contact with a distributor terminal 102 while the high frequency electrode 99 is grounded to the distributor housing 103.

It is seen, therefore, that the tester of this invention provides a simple and efficient method for testing both low voltage and high tension electrical systems, and with any defect in such systems, as to continuity and leakage, being readily evidenced by visual observation. It is to be noted also, that the various tests are readily conducted by merely manipulating the knob 17 to a desired testing position.

The modified form of the invention shown in Fig. 4 is similar in many respects to the invention described in connection with Fig. 1 except that a usual six volt battery is used as a source of supply, in place of a 110 volt 60 cycle alternating current supply. Like numbers, therefore, will be used to designate like parts in Figs. 3 and 4.

With reference to Fig. 4 a six volt battery is indicated at 105, a usual vibrator coil at 106 and a transformer at 78a. When the indicator 18 is moved to the "test light" marking 19, which corresponds to a moved position of the switch shaft 16 at which the switch arms 34 and 35 are in engagement with the terminals 41 and 46, respectively, and the switch arms 60 and 61 with the terminals 51 and 56, respectively. The "test light" circuit from the positive side 107 of the battery 105 includes conductor 108, conductor bar 39a, switch arm 34, terminal 41, conductor 109, terminal 51 of the deck unit 33, switch arm 60, conductor bar 71, conductor 110, and jack terminal 20. From the jack terminal 22 the "test light" circuit includes conductor bar 73, switch terminal 56, and conductor 111 which is connected to the negative side 115 of the battery 105. At this "test light" position it is to be noted that the switch arm 35 is ineffective at the switch terminal 45. A six-volt lamp 23a connected in series with the conductor 109 gives a continuity test, at a voltage of six volts, by lighting up when the electrical system being checked is complete or continuous.

When the indicator 18 is moved to the "leakage" marking 19 the shaft 16 of the rotary switch 15 is rotated in a counterclockwise direction, as viewed in Fig. 4, to engage the switch arms 34 and 35 with the terminals 42 and 47, respectively, and the switch arms 60 and 61 with the terminals 52 and 57, respectively. For the deck unit 32 the "leakage" circuit from the positive side 107 of the battery 105 includes the conductor 108, conductor bar 39a, switch arm 34, switch terminal 42, conductor 116, the circuit for the vibrator coil 106 and primary coil 121 of the transformer 78a, and conductor 118 which is connected to the negative side 115 of the battery 105. Connected in series in the conductor 116 is a one-ohm resistor 119. This "leakage" circuit through the deck unit 32 operates the vibrator reed 120 to set up a 60 cycle alternating current in the primary coil 121 of the transformer 78a. The switch arm 35 is ineffective at the terminal 47.

The "leakage" circuit for the deck unit 33 from the lead 122 of the secondary coil 123 of the transformer 78a includes the terminal 52, switch arm 60, conductor bar 71, and the conductor 110 to the jack terminal 20. From the jack terminal 22 this "leakage" circuit consists of the conductor bar 73, switch arm 61, terminal 57, conductor 125, and conductor 126, which is connected to the lead 127 of the transformer secondary coil 123. A test light 24 is series connected in the conductor 125.

In the "leakage" circuit, therefore, it is seen that the deck unit 32 provides for a 60 cycle alternating current in the transformer primary coil 121, to in turn provide for a 60 cycle alternating current at about 650 volts in the transformer secondary coil 123, and which voltage is supplied across the jack terminals 20 and 22 by the deck unit 33.

Any leakage in the electrical system being tested shows up by a bright or jumpy glow in the test light 24.

On movement of the indicator 18 to the "high" marking 19, as shown in Fig. 1, the shaft 16 of the switch 15 is rotated in a counterclockwise direction, as viewed in Fig. 4, to position the switch arms 34 and 35 in engagement with the terminals 43 and 48, respectively, and the switch arms 60 and 61 into engagement with the terminals 53 and 58, respectively. The "high" circuit for the deck unit 32 from the positive side 107 of the battery 105 includes the conductor 108, conductor bar 39a, switch arm 34, terminal 43, shunt conductor 128, conductor 116, the circuit of vibrator coil 106 and the transformer primary coil 121, and conductor 118 which is connected to the negative side 115 of the battery. The switch arm 35 is ineffective at the terminal 48. Thus similarly to the "leakage" circuit of the deck unit 32, the "high" circuit of the deck unit 32 provides for the energizing of the vibrator coil 106 to set up a 60 cycle alternating current in the transformer primary coil 121, with the exception that the resistance 119 is not included in the "high" circuit.

The "high" circuit for the deck unit 33 from the lead 122 of the transformer secondary coil 123 includes the terminal 52, a strap 130, connected with the terminal 53, switch arm 60, conductor bar 71, and the conductor 110 which is connected to the jack terminal 20. From the jack terminal 22 of the "high" circuit for the deck unit 33 includes the conductor bar 73, switch arm 61, terminal 58, conductor 131, and conductor 126 which is connected to the lead line 127 of the transformer secondary coil 123. It is to be noted that the conductor 131 shunts the leakage test light 24.

By elimination of the resistance 119 the transformer secondary coil 123 provides for a voltage of about 725 volts for "buzzing" or "smoking out" purposes to spot the defect in the defective part of the electrical system being tested.

When the indicator 18 is moved to its "high tension" marking 19, the shaft 16 (Fig. 4) is rotated to move the switch arms 34 and 35 into contact with the terminals 44 and 49, respectively, concurrently with the movement of the switch arms 60 and 61 into engagement with the terminals 54 and 59, respectively. The "high tension" circuit for the deck unit 32 from the positive side 107 of the battery 105 includes the conductor 108, conductor bar 39a, switch arm 34, terminal 44, a strap terminal 136 to the terminal 43, conductors 128 and 116, the circuit of the vibrator coil 106 and transformer primary coil 121, and the conductor 118 which is connected to the negative side 115 of the battery 105. The voltage and current supply to the transformer primary coil 121 is thus in all respects similar to that provided for the "high" circuit. The "high tension" circuit through the deck unit 32 includes further a center tap lead 137 from the transformer secondary coil 123, the conductor bar 39, switch arm 35, terminal 49, and a conductor 138 connected to the lead 96 of the high frequency unit 30. The lead 97 of the high frequency unit 30 is connected to the lead 127 of the transformer secondary coil 123.

The "high tension" circuit for the deck unit 33 merely consists in the grounding of the switch arms 60 and 61 at the terminals 54 and 59, respectively.

The operation of the tester for high tension testing purposes is similar in all respects to that previously described in connection with Fig. 3.

It is to be understood that the vibrator coil 106 can be incorporated within the cabinet 10 and that suitable battery leads may be substituted for the extension cord 85.

Although the invention has been described with respect to several embodiments thereof it is to be understood that it is not to be so limited since changes can be made therein which are within the full intended scope of this invention as defined by the appended claim.

I claim:

Apparatus for testing the continuity and leakage in electrical systems comprising a source of alternating current supply, a pair of test jack terminals, a rotary switch comprised of a pair of deck units mounted upon a common rotary member, with one of said deck units being connected across said source of supply, and the other of said deck units across said jack terminals, switch terminals for each of said deck units arranged in an angularly spaced relation so as to be opposite each other in a radial direction, and with the terminals on one deck unit being arranged axially opposite the terminals on the other deck unit, a series lamp connected between a first pair of axially opposite terminals, a test light connected between a second pair of terminals which are radially opposite from said first pair of terminals, a primary coil of a voltage step-up transformer connected across a third pair of terminals which are radially opposite each other with the secondary coil of said transformer being connected across a fourth pair of terminals radially opposite each other and axially opposite said third pair of terminals, a high frequency transformer unit connected across a fifth pair of terminals which are radially opposite each other, and a pair of switch arms for each of said deck units movable with said rotary member into concurrent contact engagement with corresponding radially opposite terminals on a deck unit to vary the current supply across said jack terminals.

References Cited in the file of this patent
UNITED STATES PATENTS

| | | |
|---|---|---|
| 1,143,963 | Herman | June 22, 1915 |
| 1,253,211 | Chubb | Jan. 15, 1918 |
| 1,820,242 | Nieman et al. | Aug. 25, 1931 |
| 2,021,380 | Raskhodoff | Nov. 19, 1935 |
| 2,063,311 | Guedon et al. | Dec. 8, 1936 |
| 2,091,813 | Hays | Aug. 31, 1937 |
| 2,120,855 | Buell | June 14, 1938 |
| 2,280,119 | Gorman | Apr. 21, 1942 |
| 2,310,335 | Wolfson | Feb. 9, 1943 |